(12) United States Patent
Vellette et al.

(10) Patent No.: US 6,604,391 B2
(45) Date of Patent: Aug. 12, 2003

(54) SECURITY LOCK ASSEMBLY FOR SHUT-OFF VALVE

(75) Inventors: Michel Vellette, St-Léonard (CA); Frédérick Le Page, Greenfield Park (CA); Didier Leconte, St-Antoine sur Richelieu (CA); Carl Lapointe, St-Marc sur Richelieu (CA); Marc St-Pierre, Calixa-Lavallée (CA); Samir Akel, Mont-Royal (CA)

(73) Assignee: Centre des Technologies on Gaz Naturel, Doucherville (CA)

( * ) Notice: Subject to any disclaimer, the term of this patent is extended or adjusted under 35 U.S.C. 154(b) by 0 days.

(21) Appl. No.: 10/084,104

(22) Filed: Feb. 27, 2002

(65) Prior Publication Data

US 2002/0078721 A1 Jun. 27, 2002

Related U.S. Application Data

(63) Continuation-in-part of application No. 09/562,654, filed on May 2, 2000, now abandoned.

(51) Int. Cl.⁷ .............................................. F16K 35/00
(52) U.S. Cl. ............................ 70/177; 70/179; 137/385
(58) Field of Search ...................... 70/175–180; 137/385

(56) References Cited

U.S. PATENT DOCUMENTS

| | | | |
|---|---|---|---|
| 313,211 A | 3/1885 | Jones | ....................... 70/177 X |
| 1,099,280 A | 6/1914 | Connolly | ................... 70/177 X |
| 1,111,618 A | * 9/1914 | Schoof | .......................... 70/179 |
| 1,590,032 A | 6/1926 | Jauch | ....................... 70/177 X |
| 1,621,876 A | * 3/1927 | Doerr | ......................... 137/385 |
| 3,186,196 A | 6/1965 | Moberg | ......................... 70/34 |
| 4,458,510 A | 7/1984 | Nielsen | .................... 70/177 X |
| 4,498,320 A | 2/1985 | Mullis | .......................... 70/177 |
| 4,971,289 A | 11/1990 | Pietras | ..................... 70/177 X |
| 5,014,528 A | 5/1991 | Roberts | ........................ 70/177 |
| 5,115,834 A | 5/1992 | Champagne | .............. 70/177 X |
| 5,365,759 A | 11/1994 | Bonomi | ......................... 70/177 |
| 5,799,687 A | 9/1998 | Eckel et al. | .............. 70/179 X |

* cited by examiner

Primary Examiner—Suzanne Dino Barrett
(74) Attorney, Agent, or Firm—Carter Schnedler & Monteith

(57) ABSTRACT

A security lock assembly for a shut-off valve consisting of a valve body and an exterior engageable portion secured to a gate stem so as to rotate the stem. The body has a flange with a hole therein. The security lock assembly comprises a lock disk having a central opening for receiving the engageable portion. Abutment edges are formed integrally with the disk for engagement with the engageable portion so as to rotate therewith. Indentations are formed in a bottom surface of the lock disk at a predetermined position. A pin-lock assembly is retained in the hole of the flange of the valve body. The pin-lock assembly has a pin portion upwardly biased against the lock disk. The pin portion is aligned with the indentation so as to engage therein when the valve stem is rotated to a predetermined closed position, whereby the valve is locked in the predetermined closed position by the pin portion.

7 Claims, 3 Drawing Sheets

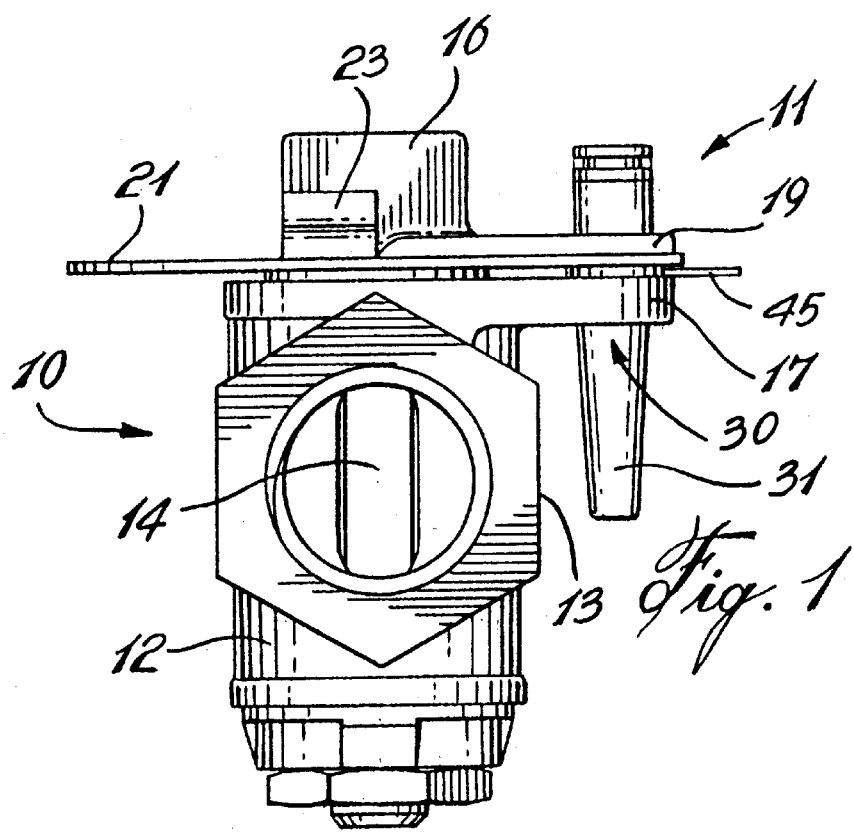
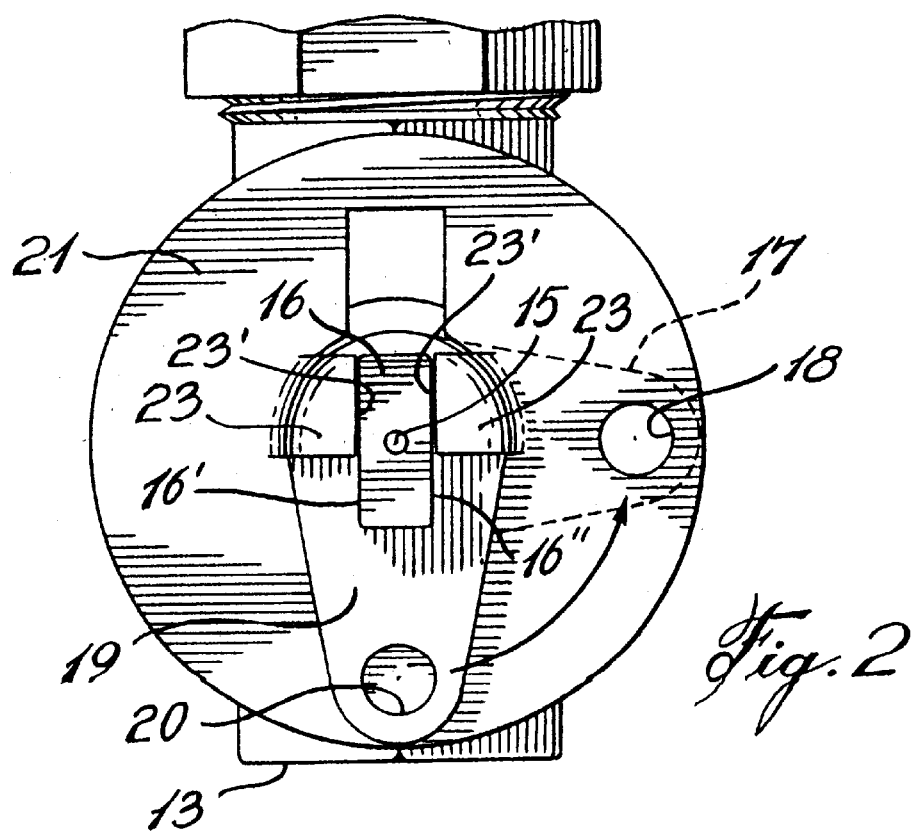

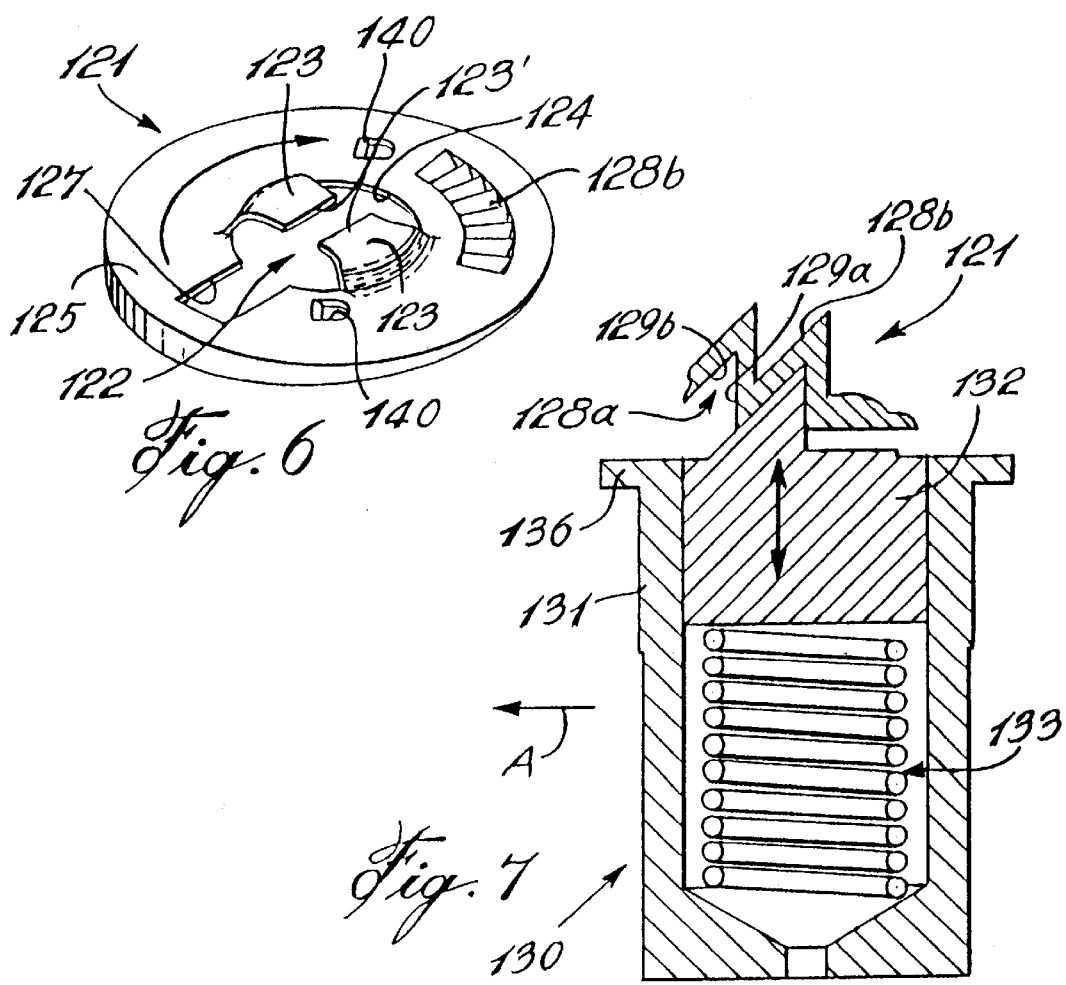
Fig. 6
Fig. 7
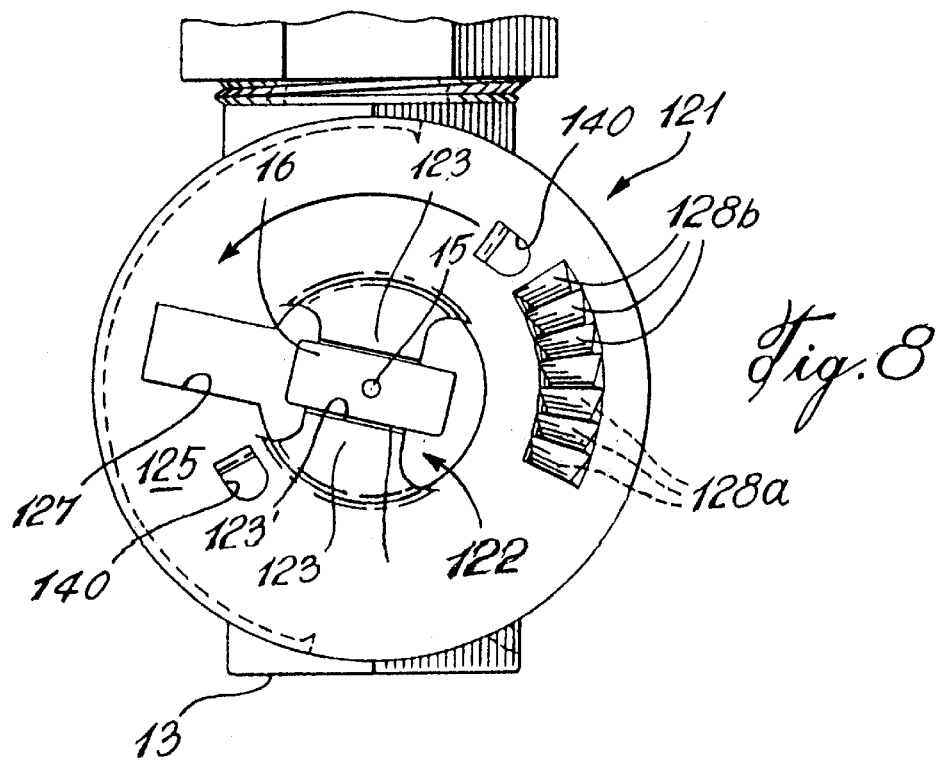
Fig. 8

SECURITY LOCK ASSEMBLY FOR SHUT-OFF VALVE

CROSS-REFERENCE TO RELATED APPLICATION

This is a Continuation-in-Part based on U.S. patent application Ser. No. 09/562,654, filed on May 2, 2000, now abandoned.

FIELD OF THE INVENTION

The present invention relates to an automatic security lock assembly for a shut-off valve, particularly for a gas shut-off valve and wherein the security lock has a lock disk engageable on the gate stem head to lock the head in a shut-off position by interconnecting with a tamperproof pin-lock.

BACKGROUND OF THE INVENTION

When gas needs to be shut off at a user site, a padlock usually locks the head of the gate stem with the valve body. However, because the shut-off valves are located outside a building to which gas is supplied, people can tamper with the lock and open the valve to resume gas supply. Because these valves are not inspected periodically the gas utility may supply gas to unauthorized users for long periods of time, causing losses of revenue.

With existing valves there is a concern with safety issues. It may be necessary for a customer to shut off his gas supply at the source, for instance, if there is a smell of gas due to a leak in the gas piping or equipment. Even though the valve is shut, there is presently no mechanism which ensures that the valve remains shut. Accordingly, the valve can be reopened by the customer unaware of a dangerous situation that may prevail.

SUMMARY OF THE INVENTION

It is a feature of the present invention to provide an automatic security lock for a shut-off valve, and particularly but not exclusively to a gas shut-off valve, and wherein a lock disk is installed and secured to the gate stem head to lock the head at a shut-off position by inter connecting with an automatically engaging tamper-proof pin-lock.

According to a broad aspect of the present invention there is provided a security lock assembly for a shut-off valve consisting of a valve body and an exterior engageable portion secured to a gate stem so as to rotate the stem. The body has a flange with a hole therein. The security lock assembly comprises a lock disk having a central opening for receiving the engageable portion. Abutment edges are formed integrally with the disk for engagement with the engageable portion so as to rotate therewith, and at least an indentation is formed in a bottom surface of the lock disk at a predetermined position. A pin-lock assembly is retained in the hole of the flange of the valve body. The pin-lock assembly has a pin portion upwardly biased against the lock disk. The pin portion is aligned with the indentation so as to engage therein when the valve stem is rotated to a predetermined closed position, whereby the valve is locked in the predetermined closed position by said pin portion.

BRIEF DESCRIPTION OF THE DRAWINGS

The preferred embodiments of the present invention will now be described with reference to the accompanying drawings in which FIG. 1 is a side view showing a gas shut-off valve equipped with the security lock assembly of the present invention;

FIG. 2 is a top view of a gas shut-off valve showing the construction of the gate stem head;

FIG. 6 is a perspective view of the lock disk of FIG. 6;

FIG. 7 is a ratchet lock assembly in accordance with the second embodiment of the present invention; and FIG. 8 is a top plan view showing a gas shut-off valve equipped with the security lock assembly in accordance with the second embodiment of the present invention.

DESCRIPTION OF PREFERRED EMBODIMENTS

Figure 3:
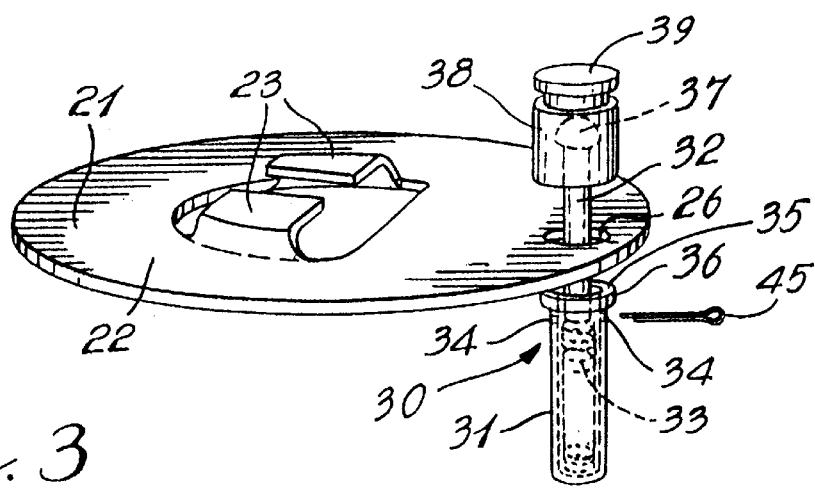
FIG. 3 is a side perspective and schematic view showing the components of the security lock assembly of the present invention.

Referring now to the drawings and more particularly to FIG. 1 it is generally shown at 10 a gas shut-off valve to which the security lock assembly 11 of the present invention has been installed. Although the present invention has been developed for a gas shut-off valve it is within the scope of the present invention to adapt the security lock assembly to other fluid flow valves. It is also further intended to adapt the security lock assembly to valves that close in either direction of rotation. As hereinshown the gas shut-off valve has a valve body 12 provided with the usual portholes 13 through which a fluid flows and which is connected to conduits, not shown. A gate 14 has a stem 15 (see FIG. 2) secured thereto and extending into an exterior engageable means, herein a head 16 which is engageable on top of the valve body and rotatable to position the gate in an opened or closed position.

Figure 4:
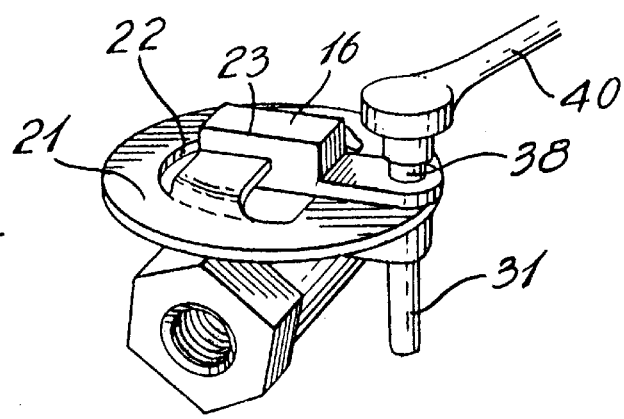
FIG. 4 is a perspective view showing a tool key for unlocking the pin engaging lock.

Referring additionally to FIGS. 2 to 4, it can be seen that the body 12 is provided with a flange 17 having a first hole 18 provided therein. If the valve was to close in both directions, the body 12 would have opposed flanges 17, as is obvious to a person skilled in the art. The hole, 18 is of a predetermined size to receive a cylindrical housing for a lock pin as will be described later. The head 16 is also provided with a flange 19 which also has a hole 20 of similar dimensions to the hole 18. The hole 20 constitutes a second hole and is alignable with the first hole 18 by rotating the head 16 to the shut-off position of the valve.

The security lock assembly comprises a lock disk 21 which is better illustrated in FIG. 4, and which is preferably constructed of spring steel. The lock disk has a central circular opening 22 for receiving therethrough the head 16 and its flange 19, as shown in FIG. 1. The disk is also provided with abutment means in the form of two rectangular tabs 23 extending inwardly from the inner edge 24 of the circular opening 22 and disposed on opposed sides of the opening. As hereinshown, the two rectangular tabs 23 are diametrically opposed sloped upwardly from the top face 25 of the disk and terminating in opposed parallel straight edges 23' spaced from one another for clamping contact with opposed parallel surfaces 16' and 16" of the head 16. The head is a rectangular post-like head. The disk is installed over the head by sliding the flange 19 through the opening 22 with the tab formations 23 aligned to each side of the head so that the gripping straight edges 231 are in close contact with the opposed parallel surfaces 16' and 16" of the head to grip the head when the disk is forced down on the head. Naturally, it is conceivable that the disk 21 may be provided with a single abutment flange to engage only one of the side walls of the head and the opening would therefore have a different shape and be square on the opposed side.

As can be better seen in FIG. 3, the disk 21 is also provided with a third hole 26 which is also of similar size to the holes 18 and 20 and the lock disk is positioned over the head 16 with the hole 26 aligned with the hole 20 of the flange 19. Accordingly, when the lock valve head 16 is rotated to a shut-off position, as shown in FIG. 4, all of the three holes are aligned with each other. Once in that position, a tamper-proof pin-lock 30 is automatically pushed through the first, second and third holes to immobilize the disk and the head by connecting them to the flange 17.

As shown in FIG. 3, the tamper-proof pin-lock 30 is comprised of a cylindrical housing 31 which has a spring biased pin 32 secured within the cylindrical housing and biased outwardly by a compression spring 33. A cotter pin 45 constitutes a detachable means and extends through opposed apertures 34 formed adjacent a top end 35 of the cylindrical housing 31. The pin 32 is pushed into the cylindrical housing 31 and compresses the spring 33. The cotter pin 45 engages the pin and maintains the pin 32 inside the housing 31 and spring 33 compressed until the disk 21 is connected with the head 16 when the valve is opened, notwithstanding the degree of opening, the cotter pin is removed and the pin 32 will be biased outwards of its housing 31 to abut a bottom portion of the disk 21, whereby it will remain mostly retracted within the housing 31.

Consequently, as soon as the valve is moved to the shut off position with all three holes 18, 20 and 26 aligned, the pin-lock 30 will be automatically released to lock the valve in its shut-off position, thus preventing the valve from being reopened accidentally.

Figure 5:
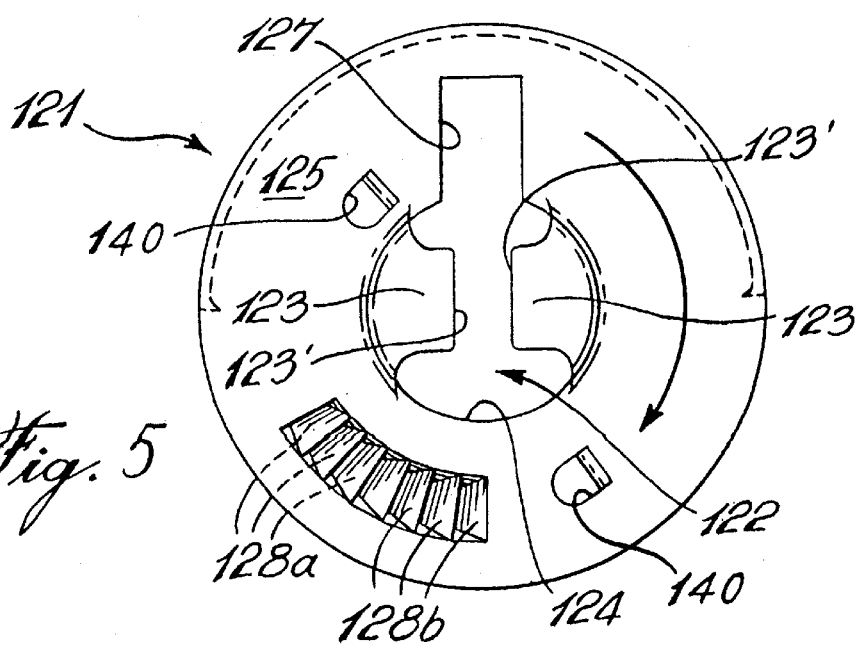
FIG. 5 is a top plan view of a lock disk in accordance with a second embodiment of the present invention.

As shown in FIG. 3, the cylindrical body 31 is placed into the hole 18 on top of the flange 17 and the collar 36 supports the cylindrical housing over the flange. When the disk 21 is installed on the head 16 and the head is rotated to a shut-off position the pin 32 can be retracted thereby causing the spring biased pin 32 to extend through the holes in the disk and the flange 19. The spring biased pin is provided with an engageable head 37 which is then fitted with a lock cap 38 which is secured thereto. The lock cap is provided with a pin engaging lock means 39 which can have various designs for engagement by a tool key 40, shown in FIG. 5, for unlocking the lock cap 38. This tool key 40 is only available to an authorized person of the gas utility for disassembly should gas service be restored to a customer. Accordingly, the present invention, when installed on the gate stem head of a gas shut-off valve, constitutes a tamper-proof lock.

Referring now to FIGS. 5 to 8, a second embodiment of the present invention is shown, wherein the shut-off valve 10 may be locked at various openings of the gate 14. The shut-off valve 10 of the second embodiment is similar to the shut-off valve 10 of the first embodiment (i.e. FIGS. 1 to 4), aside from having different lock disk and tamper-proof pin-lock. For clarity purposes, the lock disk and tamper-proof pin-lock of the second embodiment will be described by referring to similar parts of the first embodiment with the same numeral added with 100. For instance, the lock disk 21 of the first embodiment, as best illustrated in FIG. 2, will now be referred to as lock disk 121 in FIGS. 5 to 8.

As best seen in FIG. 6, the lock disk 121 has a central circular opening 122 for receiving therethrough the head 16 and its flange 19 of the valve 10, in a similar way to that shown in FIG. 1. The disk 121 is also provided with abutment means in the form of two rectangular tabs 123 extending inwardly from the inner edge 124 of the circular opening 122 and disposed on opposed sides thereof. The two rectangular tabs 123 are diametrically opposed upwardly and parallel from the top face 125 of the disk 121 and terminate in opposed parallel straight edges 123' spaced from one another for clamping contact with opposed parallel surfaces 16' and 16" of the head 16 (similar to FIG. 2). Similarly to the first embodiment, the disk 121 is installed over the head 16 by sliding the flange 19 through the opening 122 with the rectangular tabs 123 aligned to each side of the head 16 so that the parallel straight edges 123' are in close contact with the opposed parallel surfaces 16' and 16" of the head 16 to grip same when the disk is forced down thereon. It is pointed out that, due to the configuration of the disk 121, this latter may be installed on the head 16 of the valve without requiring that the valve be shut off, whether it be completely or partially. Therefore, the installation of the disk 121 does not cause a temporary lowering of the gas supply. It is also pointed out once more that the disk opening 122 may have various shapes to its opening 122 as long as it engages the side walls of the head 16.

A rectangular recess 127 is shown extending from the central circular opening 122 through the lock disk 121 in order to facilitate the insertion of the lock disk 121 onto the head 16 of the valve 10. A series of indentations 128a are provided on a bottom face of the lock disk 121 and result in protuberances 128b appearing on the top face 125 of the lock disk 121. As best seen in FIG. 7, two of the indentations 128a of the bank of indentations are shown enlarged along with their corresponding protuberances 128b. Each indentation 128a is formed by a vertical surface 129a and a slanted surface 129b.

Referring to FIG. 7, a ratchet lock is generally shown at 130. The ratchet lock 130 is comprised of a cylindrical housing 131 which has a spring-biased catch 132 secured within the cylindrical housing 131 and biased outwardly by a compression spring 133. The housing 131 is secured in the flange 17 as shown in FIG. 1. The catch 132 has a tooth portion 132' adapted for mating with indentations 128a of the series of indentations. Consequently, the rotational movement of the disk 121 in the direction of arrow A, as shown in FIG. 7, is permitted by the catch 132 translating downward and compressing the spring 133 in response thereto. However, rotation of the disk in the other direction is not permitted by the spring-biased catch 132 abutting the vertical surface 129a of the indentations 128a. This mechanism resembles a ratchet, whereby the name has been appropriately chosen to ratchet lock 130.

As mentioned above, the cylindrical housing 131 is placed in the hole 18 on top of the flange 17 of the valve 10, similarly to the first embodiment. The cylindrical housing 131 has a collar 136, whereby it is supported over the flange 17 and kept in position thereat. This enables the valve 10 to be locked in various openings. Because the housing 131 is concealed by the lock disk 121, one cannot tamper with the catch 132.

Holes 140 are defined in the lock disk 121, and are adapted for receiving a seal, not shown, which provides another level of security to the lock disk 121 embodiment, in being positioned for breaking if the lock disk 121 is removed from the valve 10. As mentioned earlier, the installation, and thus the removal, of the lock disk 121 from the valve 10 are easily achieved. Thus, a seal is placed on the valve 10 lock disk 121 to ensure that the assembly has not been tampered with. Thus, a broken seal indicates that the lock disk 121 has been removed from the valve 10.

It is within the ambit of the present invention to cover any obvious modifications of the preferred embodiment described herein, provided such modifications fall within the scope of the appended claims.

What is claimed is:

1. A security lock assembly for a shut-off valve consisting of a valve body and an exterior engageable portion secured to a gate stem so as to rotate said stem, said body having a flange with a hole therein, said security lock assembly comprising:

a lock disk having a central opening for receiving said engageable portion, abutment edges formed integrally with said disk for engagement with said engageable portion so as to rotate therewith, and a series of indentations formed in a bottom surface of said lock disk at a predetermined position and disposed in an arcuate section on said lock disk;

a pin-lock assembly retained in said hole of said flange of said valve body, said pin-lock assembly having a pin portion upwardly biased against said lock disk, said pin portion being aligned with said indentations so as to engage therein when said valve stem is rotated to a predetermined closed position, whereby said valve is locked in said predetermined closed position by said pin portion, said pin portion preventing said valve from being turned in a valve opening direction and allowing said valve to be turned in a valve closing position.

2. The security lock assembly for a shut-off valve as claimed in claim 1, wherein said valve is shut off when in said predetermined closed position, said valve being prevented from opening by said disk concealing said pin-lock assembly.

3. The security lock assembly for a shut-off valve as claimed in claim 1, wherein each said indentation of said series of indentations has a vertical surface and a slanted surface, whereby said valve is prevented from rotating in said valve opening direction when said pin portion abuts against said vertical surface of said lock disk, and said valve is enabled to rotate in a valve closing position by said pin portion sliding against said slanted surface of said lock disk.

4. The security lock assembly for a shut-off valve as claimed in claim 1, wherein said lock disk is circular.

5. The security lock assembly for a shut-off valve as claimed in claim 1, wherein each said pin-lock assembly is comprised of a housing having a spring to spring-bias said pin portion against said lock disk.

6. The security lock assembly for a shut-off valve as claimed in claim 1, wherein said valve is a gas shut-off valve.

7. The security lock assembly for a shut-off valve as claimed in claim 1, wherein said lock disk is installed on said valve without said valve requiring to be turned off.

* * * * *